United States Patent [19]

Spear

[11] Patent Number: 5,422,935
[45] Date of Patent: Jun. 6, 1995

[54] METHOD OF AND APPARATUS FOR PROVIDING A LOCAL PSTN INTERCONNECT WITH A CELLULAR BASE SITE

[75] Inventor: Stephen L. Spear, Skokie, Ill.

[73] Assignee: Motorola, Inc., Schaumburg, Ill.

[21] Appl. No.: 90,372

[22] Filed: Jul. 13, 1993

[51] Int. Cl.6 .............................................. H04Q 7/38
[52] U.S. Cl. ........................................ 379/63; 379/59; 379/220; 455/33.1
[58] Field of Search ...................... 379/58, 59, 63, 220; 455/33.1

[56] References Cited

U.S. PATENT DOCUMENTS 4,562,572 12/1985 Goldman et al. .
4,726,014 2/1988 Goldman et al. .
4,833,701 5/1989 Comroe et al. ........................ 379/60
5,036,531 7/1991 Spear .

FOREIGN PATENT DOCUMENTS 0462726 12/1991 European Pat. Off. .
0462727 12/1991 European Pat. Off. .
0462728 12/1991 European Pat. Off. .

Primary Examiner—Curtis Kuntz
Assistant Examiner—Dwayne D. Bost
Attorney, Agent, or Firm—Anthony G. Sitko

[57] ABSTRACT

A method and apparatus is provided for locally routing calls in a communication system. The method and apparatus provide PSTN interconnects (N, P, Q,) at each of the base station controllers (11, 14) and at the mobile switching center (12). A control intercept (13) intercepts PSTN command information being communicated between the mobile switching center (12) and the base station controllers (11, 14), and routes the PSTN command information to a PSTN interconnect (N, P) at a base station controller (11, 14) when local call service is required.

6 Claims, 1 Drawing Sheet

METHOD OF AND APPARATUS FOR PROVIDING A LOCAL PSTN INTERCONNECT WITH A CELLULAR BASE SITE

FIELD OF THE INVENTION

The field of the invention relates generally to cellular communication systems and more specifically to PSTN interconnects with cellular communication systems.

BACKGROUND OF THE INVENTION

A coverage area or cell in a cellular radiotelephone communication systems is provided by a Base Transceiver Station (BTS). The BTS communicates with the Mobile Subscribers (MS) via a defined air interface. In early cellular systems, each BTS communicated directly with a Mobile Switching Center (MSC). Later network architecture provided for each BTS to be connected and controlled by a Base Station Controller (BSC). The BSC and controlled BTSs form a Base Station System (BSS). A number of BSS's may be combined into a cellular radiotelephone communication system (FIG. 1) controlled by a MSC that, in turn, may be interconnected with a public switch telephone network (PSTN) composed of a number of trunk groups (N, Q, and P) (e.g. T1 lines).

The cellular system, covering a geographic area, allows MS's to communicate among MS's or a MS to communicate with a public switch telephone network (PSTN) subscriber through the PSTN interconnect provided at the MSC. Calls received through a BTS are routed to the BSC which, in turn, routes the call request to the MSC. The MSC then routes the call to a land party through the PSTN or to another MS back through a BSC and BTS.

The BSC provides message transfer and call switching as directed by the MSC. Control information received from an MS through a BTS of the BSC are routed to the MSC. Calls received by a BSC through the MSC, on a channel of communication link A, are switched under control of the BSC to the appropriate BTS in communication with the MS. Routing of all calls including those between MS's communicating through BTS's under the same BSC are routed through the MSC.

The MSC upon receipt of a call from an MS first determines whether the called party (target) is another MS under its control. If the target is another MS the MSC causes a page message to be generated for the target which is then transferred to each BSC which covers the location area in which the MS was last known to be in. The BSCs then cause the page to be transmitted through each antenna of each BTS connected to the BSC. Upon identification of a location of a target the MSC issues switching commands, directed to requesting and target BSCs, providing a signal path between the MS initiating the call and the BTS/BSC where the called party has been located.

If the MSC determines the target to be a PSTN subscriber, then the MSC composes a call request message to be transmitted into the proper trunk group of the PSTN interconnect. Trunk groups, in general and channels within trunk groups in particular, are associated with specific geographic areas. An MSC determines the geographic area in which the target is located by a translation of the called number and transmits the call request into the trunk group associated with the targers geographic area.

If the call request is received from the PSTN interconnect, then the MSC composes a page message for transmission through each BSS within the system. If the MS is within the system the MS responds through the nearest BTS. The response is transferred to the BSC, which in turn transfers the response to the MSC along with an identification of the receiving BTS. The MSC matches the call response with the call request and allocates a signal path from the PSTN interconnect to a selected trunk of the MSC to the BSC. The MSC instructs the BSC to connect the selected channel of the receiving BTS to the selected MSC trunk.

The BSCs is often located miles from the MSC, perhaps even in different PSTN area codes. Such remote locations can result in a landline telephone user having to pay toll call charges associated with having the voice "backhauled" to the MSC even when reaching a radiotelephone that is physically near the landline user. Similarly, a call from a radiotelephone to a nearby landline user may be routed miles to the MSC for connection to the PSTN and back to the landline user.

Spear (U.S. Pat. No. 5,036,531) provides one solution to this problem. The instant invention extends that solution by minimizing the charge impact on previously installed BSCs and "tricking" them into providing local PSTN interconnect functionality. The instant invention employs a control intercept to trick existing MSCs and BSCs into performing a similar function.

SUMMARY OF THE INVENTION

A method and apparatus is provided for locally routing calls in a communication system. The method and apparatus provide PSTN interconnects at each of the base station controllers and at the mobile switching center. A control intercept intercepts PSTN command information being communicated between the mobile switching center and the base station controllers, and routes the PSTN command information to a PSTN interconnect at a base station controller when local call service is required.

DETAILED DESCRIPTION OF THE PREFERRED EMBODIMENT

The solution to the problem of providing local PSTN interconnects without the involvement of the MSC, is provided by locating a PSTN interconnect at the base station system (BSC) and remotely controlling the PSTN interconnect through the use of a remote PSTN enabler (control intercept) located at the MSC. The control intercept is located at the MSC in order that PSTN interconnects of a number of BSSs may be controlled through the same control intercept resulting in toll-call reduction where ever call entry occurs.

Remote control of the PSTN interconnect is accomplished, in accordance with one embodiment of the invention, by the interception of PSTN command information at the MSC and translating such commands to the PSTN interconnect at the BSC by the control intercept. Control information (calls) received from the PSTN interconnect are, in turn, intercepted by the BSC from the PSTN interconnect and translated to the MSC by the control intercept. Such an approach minimizes signal path distance from caller to target while causing only a small increase in control traffic between BSC and control intercept.

Figure 1:
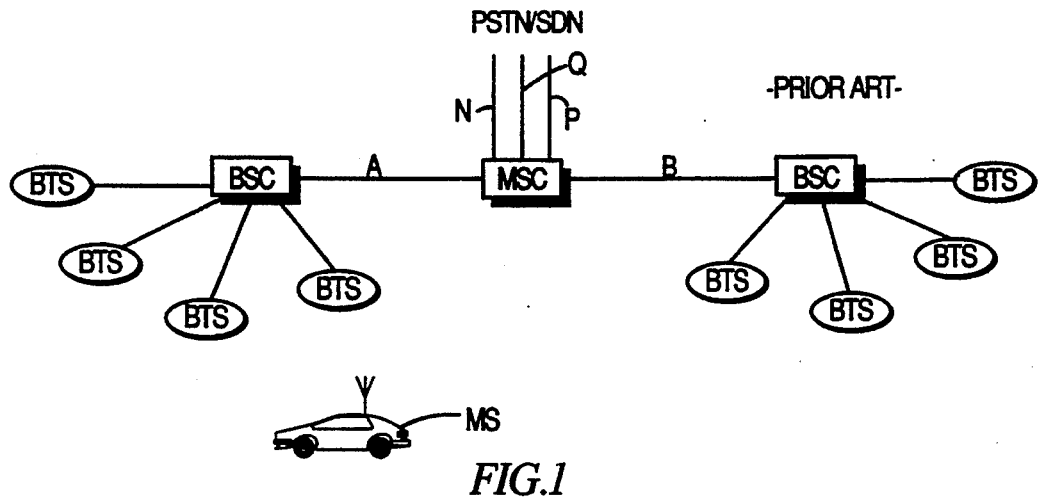
FIG. 1 illustrates a typical cellular communication system.
Figure 2:
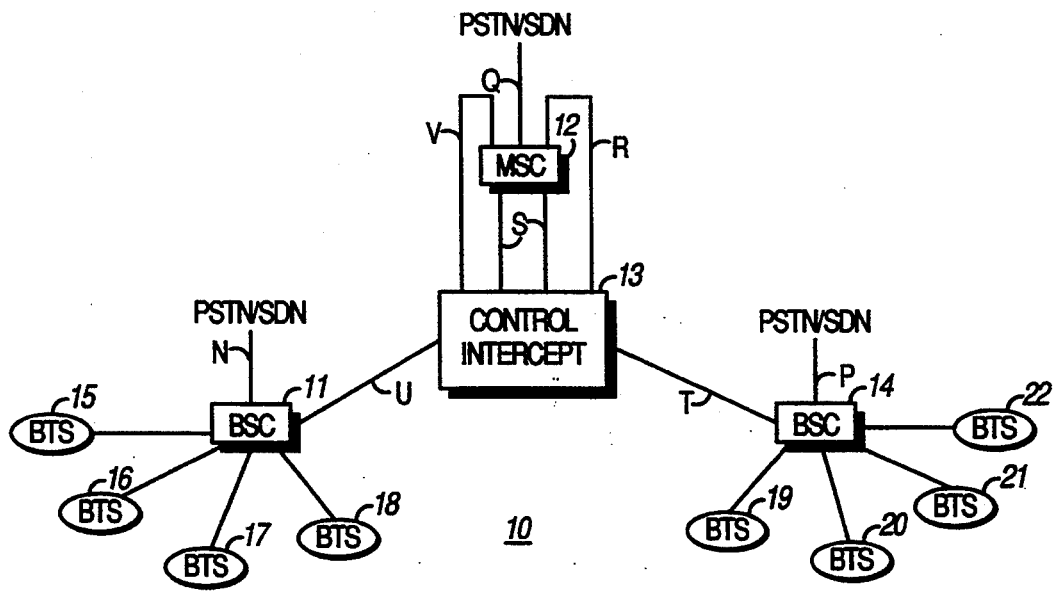
FIG. 2 illustrates a cellular communication system including a PSTN enabler in accordance with one embodiment of the invention.

FIG. 2 is a block diagram of a cellular communication system 10, generally, in accordance with the invention. Included within the communication system 10 is a first BSC 11 having a number of BTSs 15-18, and a second BSC 14 with a number of BTSs 19-22. The first and second BSCs 11 and 14 are interconnected with a control intercept 13 through use of interconnects U and T. Interconnects U and T may be any appropriate communications medium (e.g. T1 lines). The control intercept 13 is, in turn, interconnected with the MSC 12 through PSTN control link R and V and communication link S.

BSC 11 has a PSTN interconnect with PSTN trunk group N. PSTN trunk group N, in accordance with one embodiment of the invention, provides access to PSTN subscribers in a geographic area proximate the BSC 11 and BTSs 15-18. Likewise, BSC 14 has an interconnect with PSTN trunk group P. PSTN trunk group P, in accordance with one embodiment of the invention, provides access to PSTN subscribers in a geographic area proximate the BSC 14 and BTSs 19-22.

The control intercept 13 is constructed to intercept PSTN command information from a PSTN port of the MSC 12 (intended for a port of PSTN trunk group N at the PSTN interconnect of the BSC 11) on a channel of control link V and transfer such information to BSC 11. BSC 11, in turn, transfers such information to a control channel of trunk group N associated with the PSTN port of the MSC 12. The number of channels on control link V is the same as the number of ports on PSTN trunk group N. Each PSTN port of the MSC 12 on control link V has an associated port of PSTN trunk group N.

Call requests from a port of PSTN trunk group N (PSTN call requests) are transferred from the BSC 11 to the control intercept 13. The remote control intercept 13 transfers the requests to the associated PSTN port of the MSC 12 on a corresponding channel of communication link V. Upon a determination that the call on a port of the PSTN trunk group N terminates/originates through a BTS 15-18 associated with BSC 11, the control intercept 13 recognizes such case and commands the BSC 11 to provide a local interconnect between the BTS 15-18 and the port of PSTN trunk group N providing the PSTN call request.

The control intercept 13 identifies the BSC to which the PSTN call is to be directed by placing a digital pattern or tone on the channel of communication link V (port of trunk group N) providing the PSTN call request and detects the pattern or tone on a traffic channel allocated in support of the call on communication link S. Where the channel on communication link S corresponds to BSC 11 the control intercept 13 determines that the call is destined for a BTS 15-18 of BSC 11 and commands the BSC 11 to make a local connection with BTS 15-18 and the requesting port of trunk group N.

If the control intercept 13 determines that the PSTN call request is to be directed to another BSC 14 then the control intercept 13 may compose and transmit a re-route request to the PSTN through the PSTN interconnect port. The re-route request causes the PSTN call, received on trunk group N, to be transferred to trunk group Q at the MSC 12. The call request may also be handled by allocating a channel of communication link U to carry the call from the PSTN connection N to the MSC via the communication link U and the associated port of communication link V.

By way of example a call request is received by BTS 15 from a MS (not shown) for a PSTN subscriber (not shown) associated with PSTN trunk group N. The BSC 11 upon receipt of the call request transfers the call request to the control intercept 13 over a channel of communication link U. The control intercept 13, in turn transfers the call request to a port of the MSC 12 on communication link S.

The MSC 12, in turn, transmits certain PSTN commands from a PSTN port of the MSC 12 over a selected channel on communication link V. The control intercept 13 transfers such commands to BSC 11 with instructions to switch the commands into the corresponding control channel of the selected channel of PSTN trunk group N.

The MSC 12 allocates a channel of communication link U to the call from BTS 15. The control intercept 13 then transmits a unique pattern or tone on the allocated channel into the MSC 12 and listens for the repeated pattern or tone on communication link V. If the control intercept 13 is able to match transmitted and received signals then the control intercept 13 transmits commands to the BSC 11 to switch the channel of trunk group N on which the signal was detected to BTS 15 through a local connection, thereby completing the connection.

If, on the other hand, a call were received on a port of PSTN trunk group N a similar procedure is used. As above and upon receipt of the call request from the PSTN (PSTN call request), the BSC 11 transfers the information, along with an identifier of the port to the control intercept 13. The control intercept based upon the identify of the port of PSTN trunk group N transfers the information to an associated PSTN port of the MSC 12 on the corresponding channel of communication link V.

If the PSTN call is to a mobile which is being served by BTS 18, then the MSC 12 would allocate a traffic port of the MSC 12 and a traffic channel between the MSC 12 and BSC 11 in support of the PSTN call request. The control intercept 13, at this point, would transmit a signal of a unique pattern or tone on the corresponding channel of communication group V into the MSC 12 and listens for the signal on traffic channels (communication link S) for BSC 11. The control intercept would detect the repeated signal on an allocated channel to BSC 11 and generate a switching command to the BSC 11 requesting interconnection of the PSTN interconnect port providing the PSTN call request with BTS 18.

If, on the other hand, the control intercept 13 were not able to detect the signal on traffic channels (communication link S) for BSC 11. (e.g., the call is for BTS 22) then the control intercept 13 would determine that the call was directed to another BSC 14 and attempt to either re-route the call to the MSC 12 (through trunk group Q) or pass the call through to the MSC 12 via communications links U and V. The control intercept 13 re-routes the call by transferring a PSTN command to the calling port of PSTN group N requesting that the call be re-routed to PSTN trunk group Q.

Use of the control intercept 13 beneficially allows calls between BTSs and PSTN subscribers to occupy the shortest signal path possible. The use of a local PSTN interconnect with the cellular system allows the system to identify the physical location of a target and shorten signal paths where ever possible. Where signal paths cannot be shortened the control intercept re-routes the PSTN call to the most efficient entry point of the cellular system (the MSC) resulting in toll-call reduction.

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (e.g., call transfer from one BSC to another), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

I claim:

1. A method of routing calls in a communication system comprising the steps of:
   providing a PSTN interconnect at each of a plurality of base station controllers and at a mobile switching center;
   intercepting, at a control intercept in communication with the mobile switching center and the base station controllers, PSTN command information communicated between the mobile switching center and the base station controllers; and
   transferring the PSTN command information to a PSTN interconnect at a base station controller for providing local call service.

2. The method of claim 1 wherein the step of intercepting comprises:
   providing an identifying signal on a channel of a communication link from the control intercept to the mobile switching center; and
   monitoring a traffic channel allocated for call service for the identifying signal.

3. A method of routing calls in a communication system comprising the steps of:
   providing a PSTN interconnect at each of a plurality of base station controllers and at a mobile switching center;
   receiving a call at the PSTN interconnect associated with the mobile switching center;
   intercepting, at a control intercept in communication with the mobile switching center and the base station controllers, PSTN command information communicated from the mobile switching center to a base station controller; and
   transferring the PSTN command information to the PSTN interconnect at the base station controller for providing local call service.

4. A method of routing calls in a communication system comprising the steps of:
   providing a PSTN interconnect at each of a plurality of base station controllers and at a mobile switching center;
   receiving a call at a PSTN interconnect associated with a base station controller;
   intercepting, at a control intercept in communication with the mobile switching center and the base station controllers, PSTN command information being communicated to the mobile switching center from the base station controller; and
   routing the call to a base transceiver station associated with the base station controller for providing local call service.

5. A method of routing calls in a communication system comprising the steps of:
   providing a PSTN interconnect at each of a plurality of base station controllers and at a mobile switching center;
   receiving a call at a base transceiver station associated with a base station controller;
   intercepting, at a control intercept in communication with the mobile switching center and the base station controllers, PSTN command information from the base station controller to the mobile switching center; and
   transferring the PSTN command information to a PSTN interconnect at the base station controller for providing local call service.

6. A call routing apparatus for a cellular communication system comprising:
   a PSTN interconnect associated with each of a plurality of base station controllers;
   a PSTN interconnect associated with a mobile switching center;
   a control intercept in communication with the mobile switching center and the plurality of base station controllers, the control intercept operable to intercept PSTN command information being communicated between the mobile switching center and the plurality of base station controllers and for routing the PSTN command information to a PSTN interconnect for providing local call service.

* * * * *